United States Patent [19]

Schick

[11] Patent Number: 5,539,959
[45] Date of Patent: Jul. 30, 1996

[54] BELT CLIP WITH LOW-FRICTION LINING

[75] Inventor: Jean-Francois Schick, Montferrier/Lez, France

[73] Assignee: Goro S. A., Saint Privat des Vieux, France

[21] Appl. No.: 330,708

[22] Filed: Oct. 28, 1994

[30] Foreign Application Priority Data

Oct. 29, 1993 [DE] Germany ........................... 43 36 999.5
Sep. 7, 1994 [DE] Germany ........................... 44 31 835.9

[51] Int. Cl.⁶ ........................................... F16G 3/09
[52] U.S. Cl. ........................................... 24/33 B; 24/33 C
[58] Field of Search ........................... 474/255, 257; 198/844.2; 24/33 P, 31 H, 33 B, 33 C, 33 M

[56] References Cited

U.S. PATENT DOCUMENTS

| 1,137,409 | 4/1915 | Linderman | 24/33 B |
| 2,183,937 | 12/1939 | Koester | 24/33 B |
| 3,668,742 | 6/1972 | Bartmann | 24/33 C |
| 4,653,156 | 3/1987 | Stolz et al. | 24/31 H X |
| 4,937,921 | 7/1990 | Musil | 24/33 C |
| 5,097,944 | 3/1992 | Schick | 24/33 B X |

FOREIGN PATENT DOCUMENTS

| 160612 | 12/1953 | Australia | 24/31 H |
| 0477469 | 6/1991 | European Pat. Off. | |

Primary Examiner—James R. Brittain
Attorney, Agent, or Firm—Herbert Dubno; Andrew Wilford

[57] ABSTRACT

A belt joint is formed by a pair of U-shaped clips joined to respective belt ends and has interleaved bights and a rod extending along an axis through the interleaved bights of the clips to connect the belt ends together. The clips are provided inside the bights in contact with the rod with a lining of a low-friction material. This lining can be a metal alloy, for instance one containing copper such as bronze. Alternately it can be a plastic, for instance polytetrafluorethylene.

10 Claims, 4 Drawing Sheets

BELT CLIP WITH LOW-FRICTION LINING

FIELD OF THE INVENTION

The present invention relates to a belt clip. More particularly this invention concerns such a clip used with a rod to join two conveyor-belt ends together.

BACKGROUND OF THE INVENTION

A standard flat or conveyor belt is made of at least one piece of belting whose ends are attached together by an assembly comprising at least one clip on each belt end and a rod interconnecting the clips like a hinge. Each such clip or connector typically is made of metal and has a pair of legs adapted to embrace the respective belt end and a bight portion interconnecting the outer ends of the legs. Each leg in turn is formed with at least two throughgoing holes that align with the holes of the leg on the opposite face of the belt, and staples are driven through the registering holes from one side of the belt and are crimped over on the other side. Normally a plurality of the clips are secured to each end of the belt, forming a succession of knuckles that are interleaved and then connected together by the rod to form a very strong but bendable joint.

As described in my earlier U.S. Pat. No. 5,095,590 and my European patent 477,469 (based on a French priority of 1 Apr. 1992) the clips are stamped out of sheet metal so that all the upper legs extend unitarily from an upper mounting plate and all the lower legs extend unitarily from a lower mounting plate. The metal of the blank from which the clips are formed is bent over between the actual legs and bight of the clips so it is double-thick in this region and, therefore, more resistant to wear.

Since the connecting pin extending through the bights and the clips themselves are made of corrosion-resistant steel, considerable friction occurs between the connecting pin and the bights since corrosion-resistant steel has a relatively high coefficient of friction. The friction therefore leads to very severe wear more particularly of the bights, so that in the end the bights and finally the complete belt joint may be damaged. Damaged belt jointing leads to expensive repairs and disturbances in operation which must be avoided if at all possible.

OBJECTS OF THE INVENTION

It is therefore an object of the present invention to provide an improved belt clip.

Another object is the provision of such an improved belt clip which overcomes the above-given disadvantages, that is which is less likely to wear than the prior-art clips.

SUMMARY OF THE INVENTION

According to this invention a belt joint is formed by a pair of U-shaped clips joined to respective belt ends and has interleaved bights and a rod extending along an axis through the interleaved bights of the clips to connect the belt ends together. The clips are provided inside the bights in contact with the rod with a lining of a low-friction material. This lining can be a metal alloy, for instance one containing copper such as bronze. Alternately it can be a plastic, for instance polytetrafluoroethylene.

The result of these features of the invention is a considerable reduction in friction between the bights and the connecting pin. The fact that the lining of the bights is made of a wearing material causes no difficulties in this context. Not only can the material be very wear-resistant but also the wear of the lining can be tolerated if for no other reason than that the bights themselves do not wear and can therefore always receive satisfactorily the stresses acting on them. Also, the wear itself is reduced considerably because of the reduction in friction. The belt connector according to the invention therefore has a very much longer life than previously and so there is no risk of difficult repairs and lengthy interruptions in operation.

In accordance with a further feature of the invention the lining extends annularly completely around the rod in each of the bights. Each clip has a pair of parallel arms extending away from the respective bight and the lining extends along an inner surface of the arms. In addition each of the bights is formed with an inwardly open slot and the linings each have a web projecting outward into the respective slot. Normally the webs and slots are of complementary T-section. Each bight has a pair of axially oppositely directed end faces and the respective lining generally covers the respective end faces. An adhesive, welding, or vulcanization can secure the linings to the bights.

According to another feature of the invention the belt-connector clip has according to the invention an arcuate U-section bight centered on an axis and formed with a radially projecting ridge, and a pair of parallel U-section arms extending parallel to each other from the bight. This ridge substantially strengthens the clip. In particular the bight and arms are unitarily formed with each other of sheet metal of uniform thickness. The ridge projects radially outward and the bight and arms each have a back part having a pair of axially spaced edges, side parts extending inward parallel to each other and perpendicular to the axis from the edges and having inner edges, and edge parts extending axially toward each other from the inner edges and having axially confronting but spaced edges.

These features of the invention practically exclude any deformations of the hinge bights or arches, with these hinge arches constantly retaining their original bending radius and consequently the original geometrical symmetry between the hinge arches and the joint connecting rod. This will entail a considerable reduction in Hertzian and any other frictional stresses. Consequently wear and possibly heat seizure tendencies will be greatly reduced with the service lives of the belt connectors and/or their connecting clips being considerably extended, with major repairs and downtime no longer being a threat.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
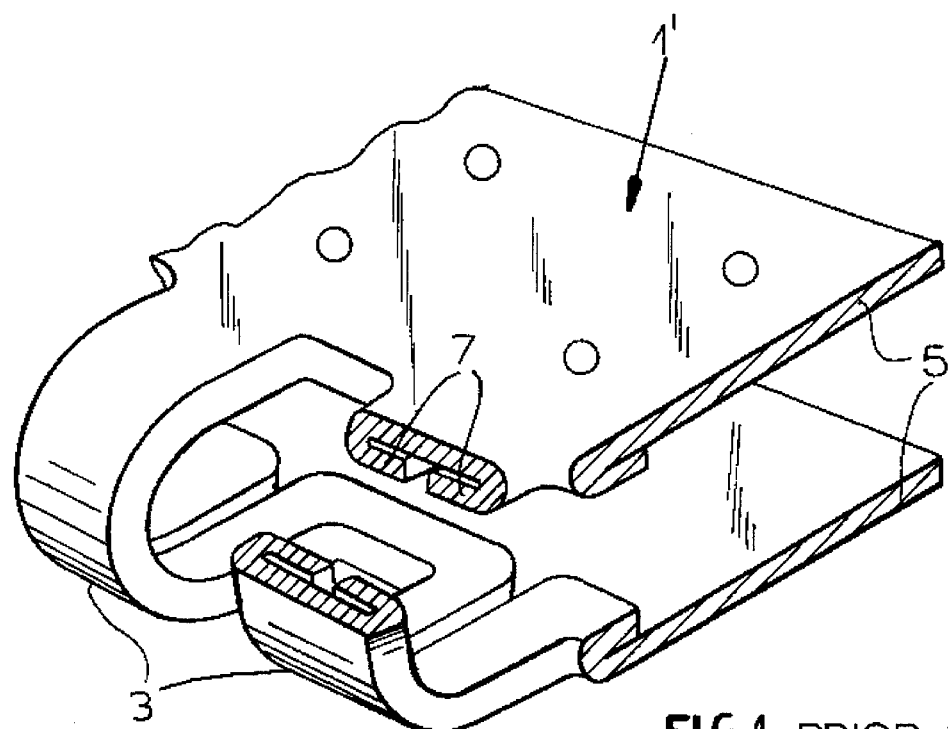
FIG. 1 is a large-scale partly sectional view of a detail of a prior-art clip.
Figure 2:
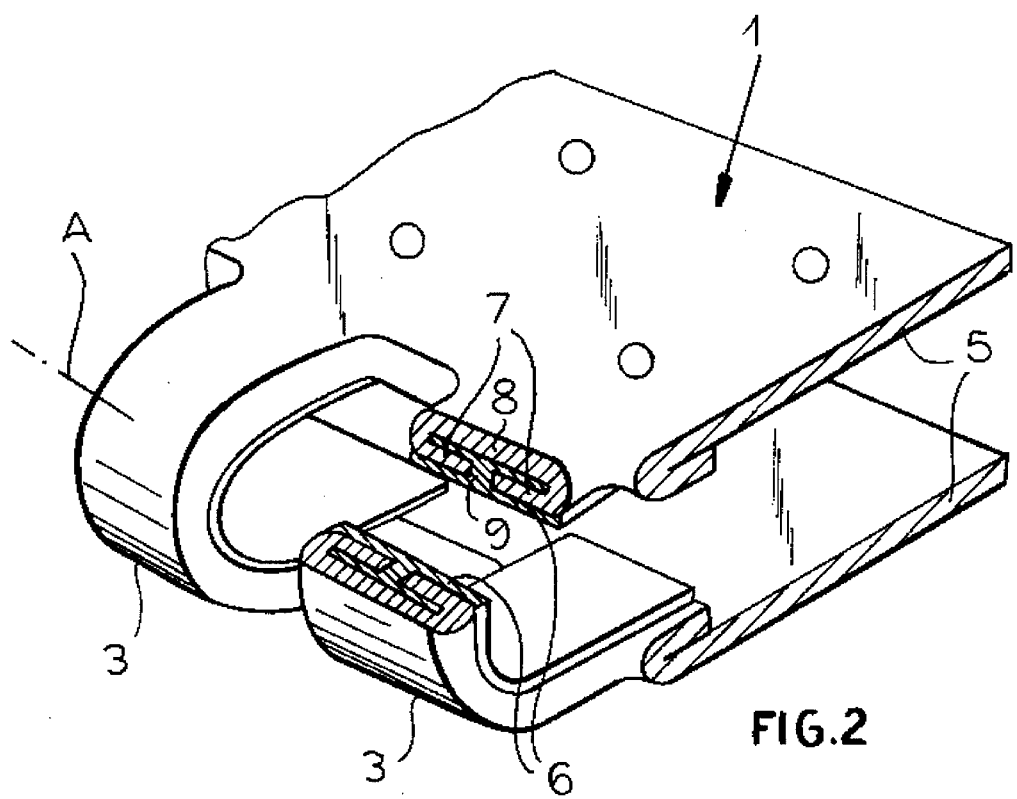
FIG. 2 is a view like FIG. 1 of a clip according to the invention.
Figure 3:
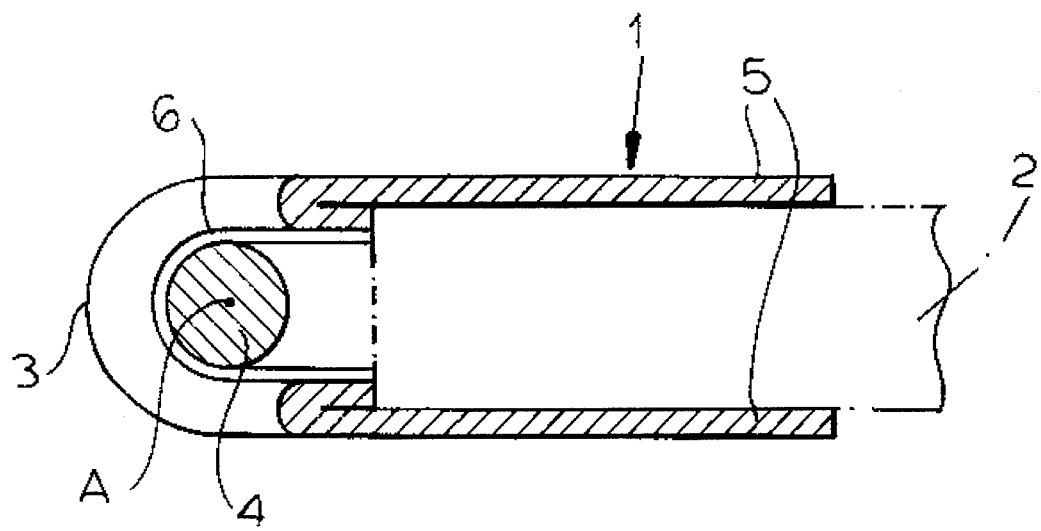
FIG. 3 is a section through the clip assembly of this invention.
Figure 4:
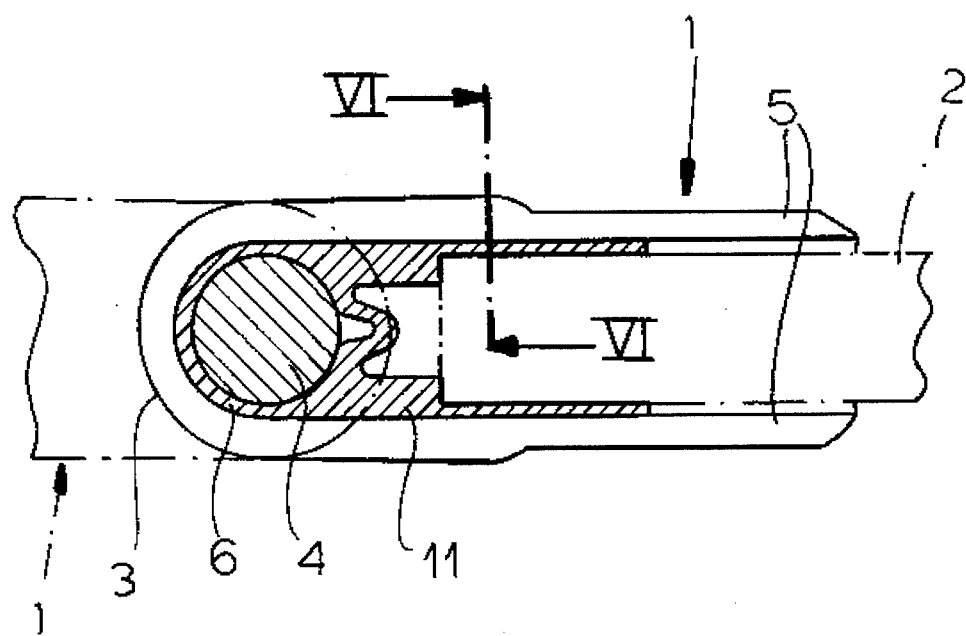
FIG. 4 is a view like FIG. 3 of another arrangement according to the invention.
Figure 5:
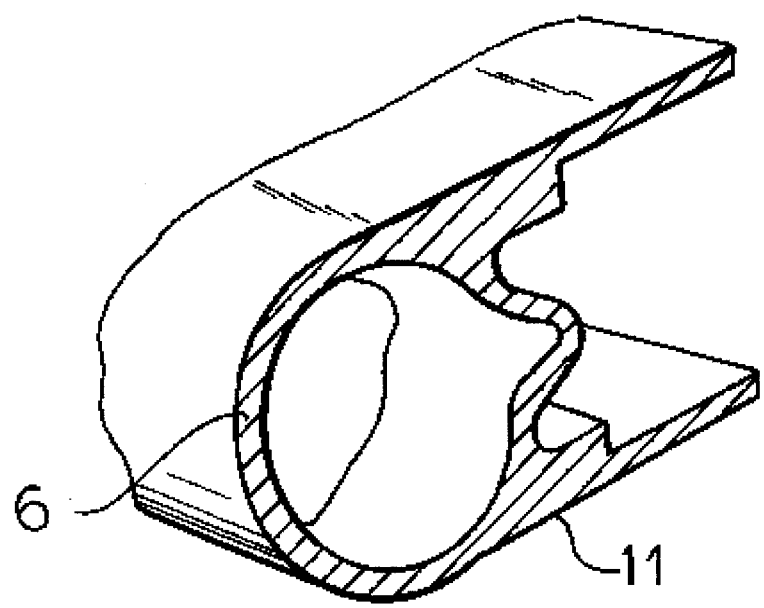
FIG. 5 is a sectional perspective view of the lining used in FIG. 4.
Figure 6:
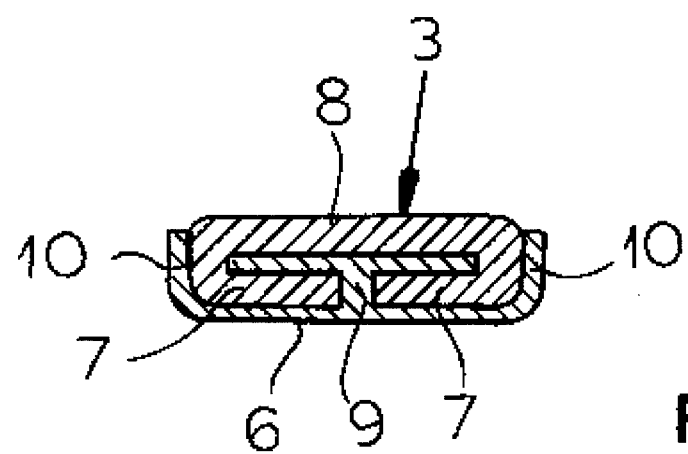
FIG. 6 is a section taken along line VI—VI of FIG. 4.

FIG. 1 shows a prior-art belt fastener or clip 1' comprised of a pair of parallel sheet-metal plates or arms 5 each formed with a plurality of arms. The outer ends of the arms are interconnected by bights 3. The clip 1' is made of sheet metal that is folded over as indicated at 7 so that it is double-thick in a region defining a passage for a connector pin as described below.

According to the invention as seen in FIGS. 2 to 6 a belt connector has U-shaped fasteners or clips 1 disposed in a row and serving to connect ends 2 of conveyor belts. The clips 1 each have a bight 3 receiving a connecting pin 4 centered on an axis A and clip arms 5 into which the bights 3 merge. The bights 3 have at least on their inside a lining 6 of a low-friction wearing material. The bights 3 of the embodiment have a flat U-shaped cross-section having inwardly bent-round U-arms 7. The lining secured to the inside of the bights 3 between the U-base 8 and the bent-round U-arms 7. The lining 6 is 6 can engage by way of a T-shaped extension 9 behind the U-arms 7 and otherwise engages over the two axial end surfaces 10 of the bights 3.

The lining is made of a plastic, preferably polytetrafluorethylene which has a very low coefficient of friction. If a sealing strip 11 is provided to close the bights 3 and the common connecting pin 4 for hinged-together bights 3 of two belt connectors, the sealing strip 11 merges into the lining 6 of the bights 3. In this event each lining 6 of the bights 3 and the sealing strip 11 can be a unitary component or molding.

Figure 7:
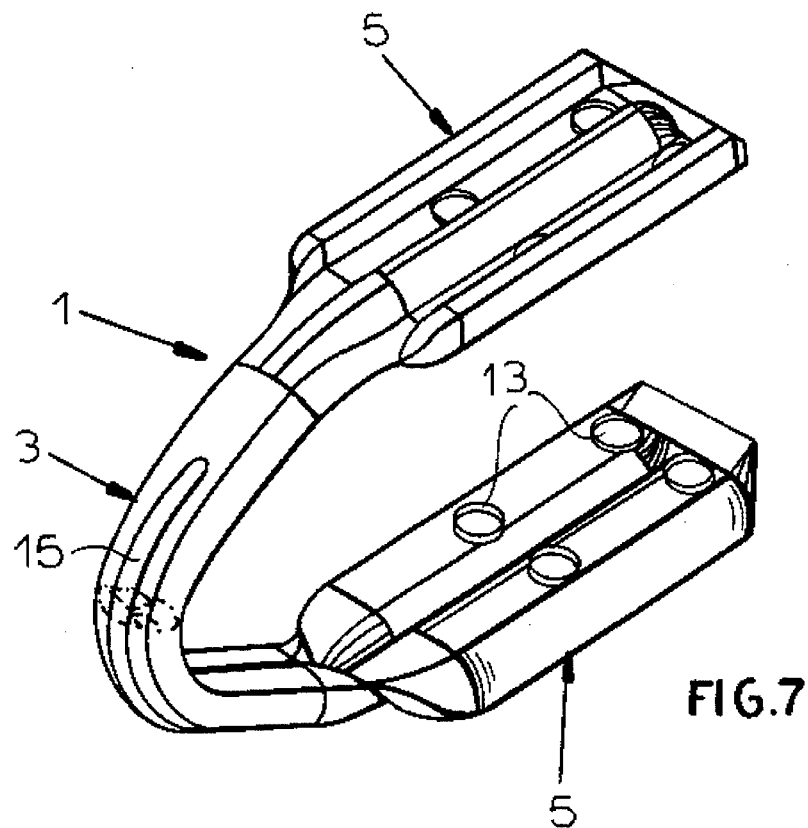
FIG 7 is a perspective view of another clip according to the invention.
Figure 8:
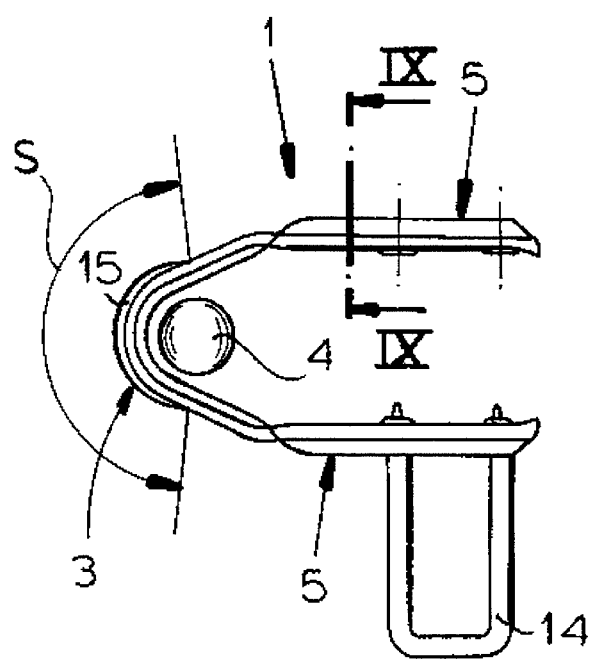
FIG. 8 is a side view of the FIG, 7 clip.
Figure 9:
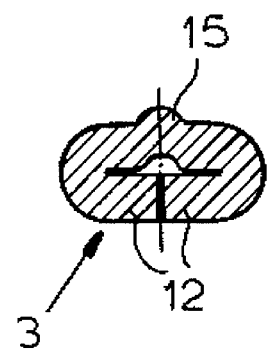
FIG. 9 is a large-scale section taken along line IX—IX of FIG. 8.

FIGS. 7 to 9 show a belt connector including U-shaped connecting clips 1 for the connection of conveyor belt ends 2. The connecting clips 1 include hinge arches or bights 3 and clamping legs 5 connected to the hinge bights 3. The hinge bights 3 are of a U-shaped cross section with U-legs 12 bent inward close to one another. The clamping legs 5 include flush holes 13 for insertion and penetration of fastening staples 14 as described in U.S. Pat. Nos. 4,050,138, 4,144,628, 4,538,755, 4,620,657, and 4,688,711. The hinge bights 3 include an external reinforcing bead or ridge 15 extending over a specified area S of the arch and therefore its bending radius. The reinforcing bead 15 is external. This ensures the correct symmetry between the hinge bights 3 and the joint connecting rod 4 at all times, while reducing most damaging stresses.

I claim:

1. In a belt joint formed by a pair of U-shaped clips joined to respective belt ends and having interleaved bights and a rod extending along an axis through the interleaved bights of the clips to connect the belt ends together, the improvement wherein the clips are provided inside the bights in contact with the rod with a lining of a low-friction material, each of the bights is formed with an inwardly open T-section slot, and the linings each have a complementary T-section web projecting outward into the respective slot.

2. The belt joint defined in claim 1 wherein the lining is a metal alloy.

3. The belt joint defined in claim 2 wherein the alloy includes copper.

4. The belt joint defined in claim 3 wherein the alloy is bronze.

5. The belt joint defined in claim 1 wherein the lining is a plastic.

6. The belt joint defined in claim 5 wherein the plastic is polytetrafluorethylene.

7. The belt joint defined in claim 1 wherein the lining extends annularly completely around the rod in each of the bights.

8. The belt joint defined in claim 7 wherein each clip has a pair of parallel arms extending away from the respective bight and the lining extends along an inner surface of the arms.

9. The belt joint defined in claim 1, further comprising an adhesive securing the linings to the bights.

10. In a belt joint formed by a pair of U-shaped clips joined to respective belt ends and having interleaved bights and a rod extending along an axis through the interleaved bights of the clips to connect the belt ends together, the improvement wherein the clips are provided inside the bights in contact with the rod with a lining of a low-friction material, and each bight has a pair of axially oppositely directed end faces and the respective lining generally covers the respective end faces.

\* \* \* \* \*